United States Patent
Stokes et al.

(10) Patent No.: US 6,628,828 B1
(45) Date of Patent: Sep. 30, 2003

(54) SYSTEM AND METHOD FOR PERFORMING A RECOLORING OPERATION SEQUENCE ON COLOR OBJECTS

(75) Inventors: Michael D. Stokes, Redmond, WA (US); Adrian Secchia, Bellevue, WA (US); Gilman K. Wong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,214

(22) Filed: Apr. 24, 2000

(51) Int. Cl.[7] .................................................. G06K 9/00
(52) U.S. Cl. ...................................... 382/167; 358/518
(58) Field of Search ................................. 382/162–167; 358/504–540; 345/598–610

(56) References Cited

U.S. PATENT DOCUMENTS

| | | | | |
|---|---|---|---|---|
| 5,793,901 A | * | 8/1998 | Matsutake et al. | 382/294 |
| 5,841,898 A | * | 11/1998 | Liguori | 382/164 |
| 5,912,994 A | * | 6/1999 | Norton et al. | 382/162 |
| 6,016,354 A | * | 1/2000 | Lin et al. | 382/162 |
| 6,057,854 A | * | 5/2000 | Davis et al. | 345/433 |
| 6,351,557 B1 | * | 2/2002 | Gonsalves | 382/167 |

OTHER PUBLICATIONS

US 5,853,673, 12/1998, Young (withdrawn)*
"Multimedia Systems and Equipment Colour Measurement and Management", International Electrotechnical Commission, 61966–2–2 IEC.
"Colour Management in Multimedia Systems", International Electrotechnical Commission, 61966–2–1 IEC: May 28, 1998.
"Specification ICC.1: Sep. 1998 File Format for Color Profiles", International Color Consortium, 1994–1998.

* cited by examiner

*Primary Examiner*—Jingge Wu
(74) *Attorney, Agent, or Firm*—Leydig, Voit & Mayer, Ltd.

(57) ABSTRACT

A system and method for recoloring color objects selectively applies color processing operations in a particular pipelined sequence to offer improved performance and quality of color processing. The recoloring sequence includes a transformation by a 5×5 matrix that handles various types of transformations in the color space of the color object, a gamma correction, a bi-level thresholding operation, and a conversion into a color space, such as the CMYK space, for an output device. Each of these operations in the recoloring sequence may be selectively activated or deactivated depending on the attributes of the color object being processed and the desired recoloring effects. The transformation with the 5×5 matrix allows various transformation operations, such as rotation, scaling, translation, shearing, and perspective in the color space of the color object to be combined and performed in a single step, resulting in significantly improved processing efficiency.

12 Claims, 4 Drawing Sheets

$$\underbrace{\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ t_a & t_r & t_g & t_b & 1 \end{pmatrix}}_{138} \underbrace{\begin{pmatrix} A \\ R \\ G \\ B \\ 1 \end{pmatrix}}_{136} = \underbrace{\begin{pmatrix} A+t_a \\ R+t_r \\ G+t_g \\ B+t_b \\ 1 \end{pmatrix}}_{140}$$

FIG. 4A

$$\underbrace{\begin{pmatrix} s_a & 0 & 0 & 0 & 0 \\ 0 & s_r & 0 & 0 & 0 \\ 0 & 0 & s_g & 0 & 0 \\ 0 & 0 & 0 & s_b & 0 \\ 0 & 0 & 0 & 0 & 1 \end{pmatrix}}_{142} \underbrace{\begin{pmatrix} A \\ R \\ G \\ B \\ 1 \end{pmatrix}}_{136} = \begin{pmatrix} s_a A \\ s_r R \\ s_g G \\ s_b B \\ 1 \end{pmatrix}$$

FIG. 4B

$$\underbrace{\begin{pmatrix} \cos\theta & -\sin\theta & 0 & 0 & 0 \\ \sin\theta & \cos\theta & 0 & 0 & 0 \\ 0 & 0 & 1 & 0 & 0 \\ 0 & 0 & 0 & 1 & 0 \\ 0 & 0 & 0 & 0 & 1 \end{pmatrix}}_{146} \underbrace{\begin{pmatrix} A \\ R \\ G \\ B \\ 1 \end{pmatrix}}_{136} = \begin{pmatrix} A\cos\theta - R\sin\theta \\ A\sin\theta + R\cos\theta \\ G \\ B \\ 1 \end{pmatrix}$$

FIG. 4C

$$\underbrace{\begin{pmatrix} 1 & 0 & sh_a & 0 & 0 \\ 0 & 1 & sh_r & 0 & 0 \\ 0 & 0 & 1 & 0 & 0 \\ 0 & 0 & sh_b & 1 & 0 \\ 0 & 0 & 0 & 0 & 1 \end{pmatrix}}_{148} \underbrace{\begin{pmatrix} A \\ R \\ G \\ B \\ 1 \end{pmatrix}}_{136} = \begin{pmatrix} A+sh_a G \\ R+sh_r G \\ G \\ B+sh_b G \\ 1 \end{pmatrix}$$

FIG. 4D

$$\underbrace{\begin{pmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ p_a & p_r & p_g & p_b & 1 \end{pmatrix}}_{152} \underbrace{\begin{pmatrix} A \\ R \\ G \\ B \\ 1 \end{pmatrix}}_{136} = \underbrace{\begin{pmatrix} A \\ R \\ G \\ B \\ p_a A + p_r R + p_g G + p_b B + 1 \end{pmatrix}}_{154}$$

FIG. 4E

$$\underbrace{\begin{pmatrix} 1 & 0 & 0 & 0 & 0 \\ 0 & 0.299 & 0.299 & 0.299 & 0 \\ 0 & 0.587 & 0.587 & 0.587 & 0 \\ 0 & 0.114 & 0.114 & 0.114 & 0 \\ 0 & 0 & 0 & 0 & 1 \end{pmatrix}}_{156}$$

FIG. 4F

$$\underbrace{\begin{pmatrix} 1 & 0 & 0 & 0 & 0 \\ 0 & 0 & 0 & 0 & 1 \\ 0 & 0 & 0 & 0 & 1 \\ 0 & 0 & 0 & 0 & 1 \\ 0 & 0 & 0 & 0 & 1 \end{pmatrix}}_{158}$$

FIG. 4G

SYSTEM AND METHOD FOR PERFORMING A RECOLORING OPERATION SEQUENCE ON COLOR OBJECTS

TECHNICAL FIELD OF THE INVENTION

This invention relates generally to computer graphics, and more particularly to the use of a computer to perform various color processing operations, such as those collectively known as recoloring operations.

BACKGROUND OF THE INVENTION

Digital computers have long been used for processing color images to perform general editing operations and/or add special effects. As the average processing power of home computers has increased tremendously in comparison with conventional mainframe and workstation computers over the last decade or so, computer graphics software applications with significantly improved color processing features have become increasingly popular. For instance, a user may use a digital camera to capture a digital color picture, edit the picture by performing compositing, morphing, or various other computer graphics operations involving color processing, and display or print out the edited color picture. The effective use of color graphics has also become an important aspect of computer user interface for operating systems, computer applications, as well as the designs of Web pages for the World-Wide Web (WWW) on the Internet.

When a color image is imported to a computer from a source, which may be for example an input device such as a digital camera, it is often desirable or necessary to edit the color image by performing processing steps commonly known as "recoloring" operations. The recoloring operations include, for example, color key, various transformations in the color space, gamma correction, contrast adjustment, etc. The recoloring operations often also include a transformation of the processed color image into the color format of an output device for displaying or printing the processed color image.

Conventionally, the recoloring functions are often provided by a computer graphics software product in the form of various "filters." To recolor a color image, the user typically has to select and apply individual filters to the image one at a time. The order in which the filters are applied to the color image is often arbitrary, and such a recoloring process is often tedious and time consuming. Recently, it has been recognized that recoloring is a key feature in the communication and reproduction of computer graphics for future generations of software products. There is therefore a need for an optimized yet flexible way to perform recoloring operations on color objects.

SUMMARY OF THE INVENTION

In view of the foregoing, the present invention provides a system and method for recoloring color objects that applies selected color operations in a pipelined manner to provide improved performance and quality of color processing. The color processing operations in the recoloring sequence include a transformation by a five-by-five (5×5) matrix that handles various types of transformations in the color space of the color object, a gamma correction operation, a bi-level thresholding operation, and a conversion into the color space of an output device, such as the CMYK space. Each of these operations in the "pipelined" recoloring sequence may be selectively activated or deactivated depending on the attributes of the color object being processed and the effect of color processing to be achieved. This recoloring operation sequence takes advantage of the inherent structures contained in the steps to combine them in an optimal order that can be tailored to support various processing tasks.

In accordance with a feature of the invention, the transformation with the 5×5 matrix in the recoloring sequence allows various operations, such as rotation, scaling, translation, shearing, and perspective operations in the color space of the color object to be combined in a single step. As a result, these color operations can be performed much more efficiently and are less prone to errors.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4A–G are schematic diagrams showing exemplary 5×5 matrices for performing various color transformation operations as a step in the recoloring sequence.

DETAILED DESCRIPTION OF THE INVENTION

Figure 1:
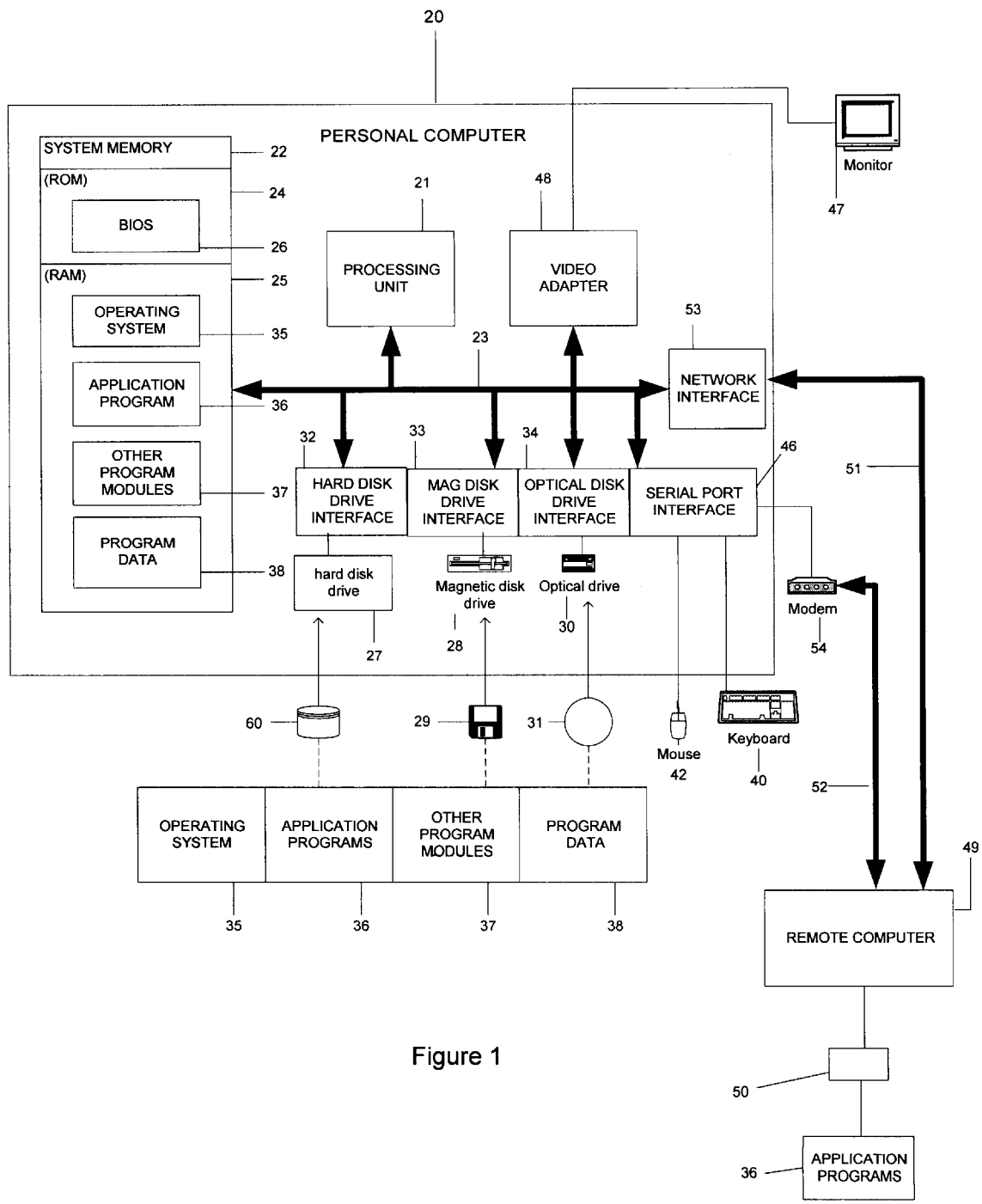
FIG. 1 is a block diagram generally illustrating an exemplary computer system on which the present invention may be performed.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM). 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
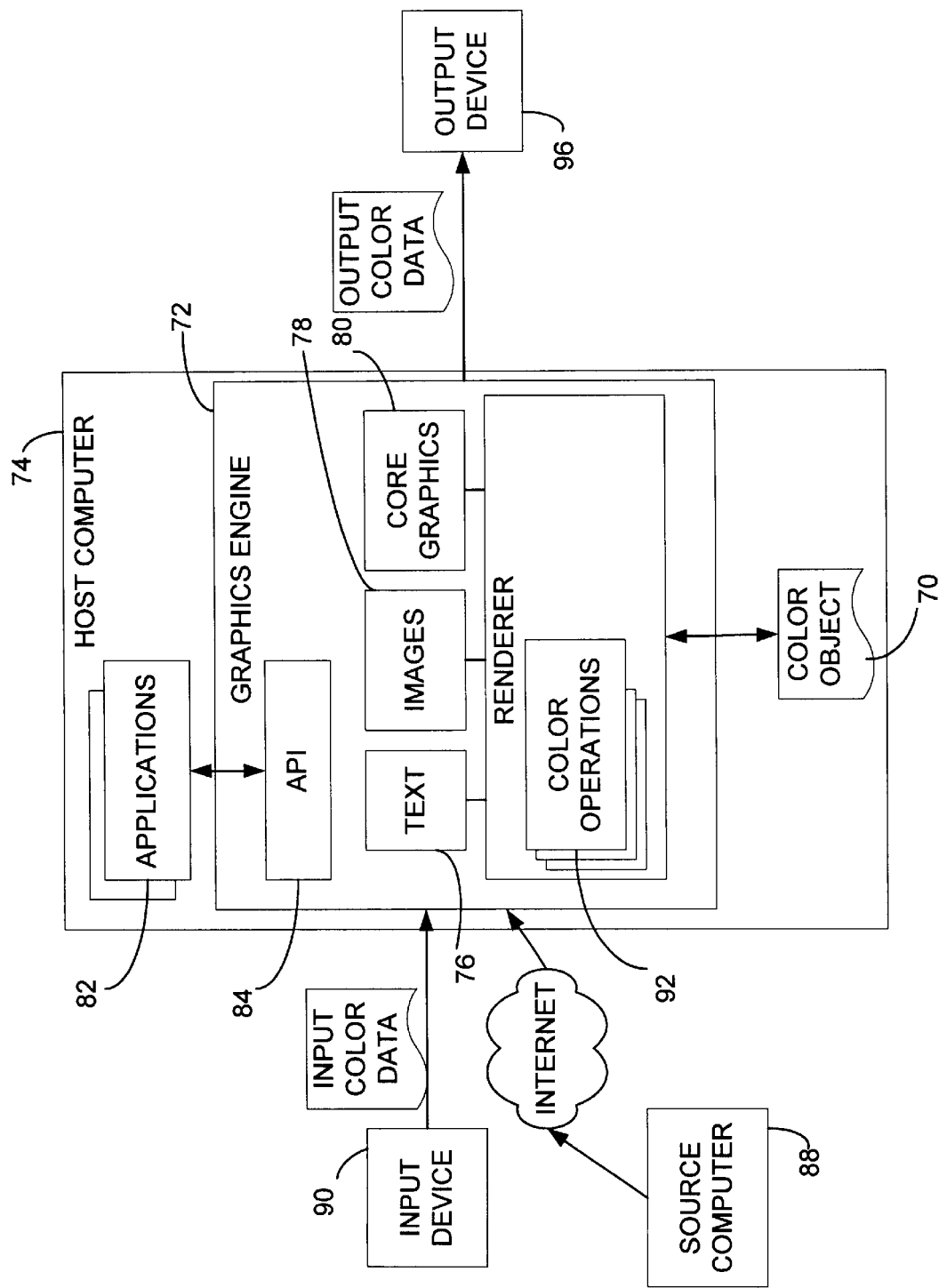
FIG. 2 is a schematic diagram showing an embodiment of a computer system having a graphics engine for performing graphics processing operations on color objects.

Referring now to FIG. 2, the present invention is directed to an optimized yet flexible way to process color objects for recoloring purposes. In accordance with the invention, selected recoloring operations are structured and carried out in a particular sequence to allow the recoloring process to be performed in an optimal manner.

In the illustrated embodiment of FIG. 2, the color processing system includes a graphics engine 72 responsible for controlling and performing various computer graphics and color operations. The graphics engine 72 may be part of an operating system of the host computer 74 that is usable by various applications 82. For example, the graphics engine may be part of the Graphics Device Interface Plus (GDI+) library of the Windows 2000 operating System by Microsoft Corporation. Alternatively, the graphics engine 72 may be part of a separate computer software application, such as one of the various software products for editing and printing photographic pictures captured by digital cameras.

In the illustrated embodiment, the graphics engine 72 is part of an operating system and includes a component 76 for handling text objects, a component 78 for handling image objects, and another component 80 for handling computer graphics objects generated by digital painting, modeling, or drawing programs. The data of each of these object types are rendered by a renderer 82 into an image format suitable for visual representation such as displaying or printing. The graphics engine 72 also includes, among other things, modules 92 for performing the color processing operations in the recoloring sequence as will be described in greater detail below. To allow the color processing modules to be used by other applications or modules, the graphics engine provides application programming interfaces (APIs) 84 through which the color processing modules 92 may be invoked.

In a preferred embodiment, the color data on which various color processing operations may be performed is contained in an object such as the color object 70. The graphics data of the color object 70 may be created on the computer 74 on which the graphics engine 72 resides. For instance, the color object 70 may represent text, images or graphic elements created by a user using graphics applications. Alternatively, the data of the color object 70 may be imported from another computer. For example, the color data may be downloaded by the host computer 74 over the Internet from another computer 88 as part of the contents of a Web page. In another scenario, the color data may be originally generated by an input device 90. The input device 90 may be, for example, a digital camera, a scanner, a digital video recorder, etc. The processed color object may be used for output to an output device 96 for presenting the graphics data in a form viewable by the user.

Figure 3:
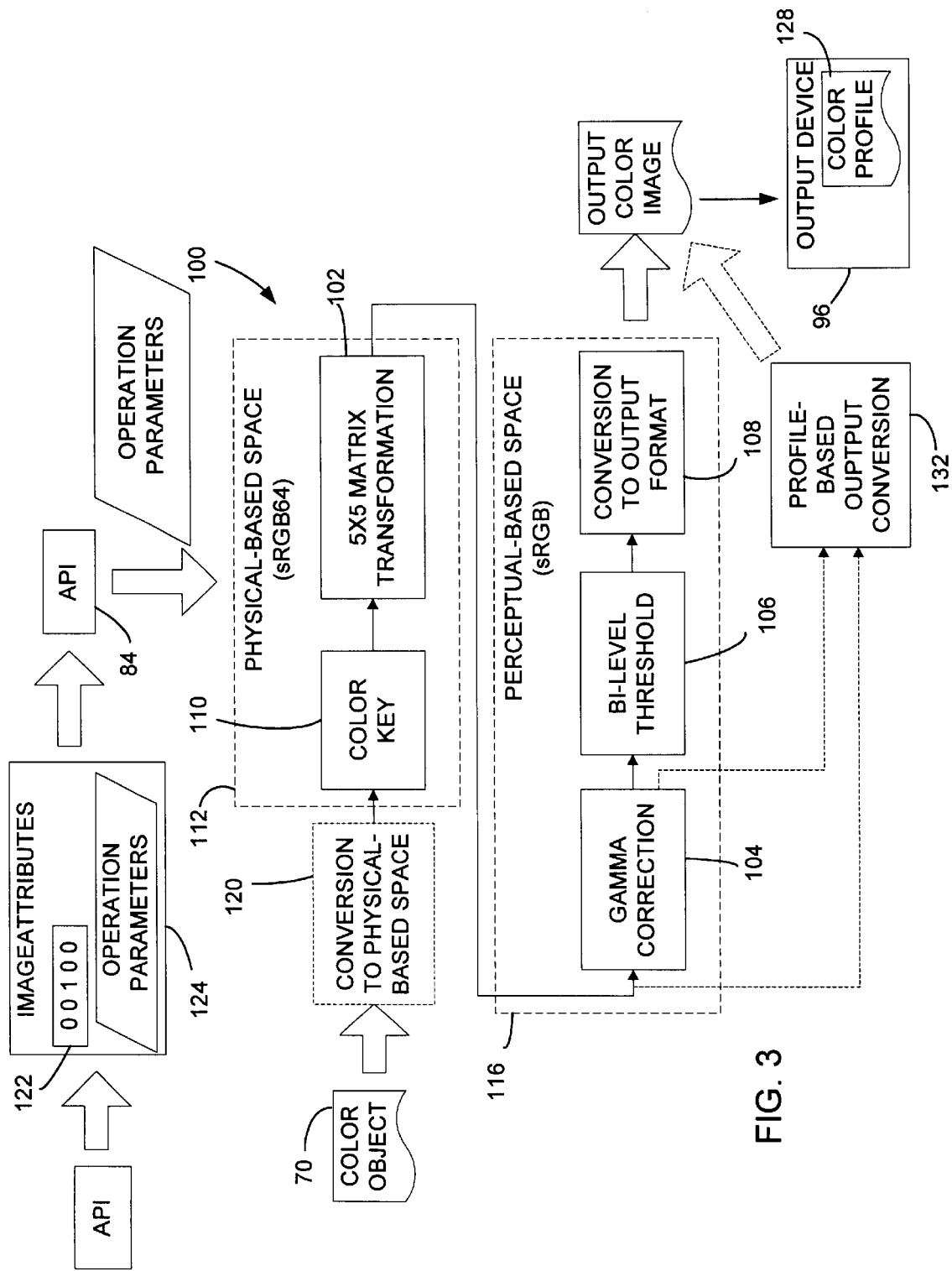
FIG. 3 is a schematic diagram showing an embodiment of a recoloring sequence that includes color operations selectively performed in a pipelined manner in accordance with the invention.

Turning now to FIG. 3, in accordance with the invention, selected color processing operations for recoloring are structured and carried out in a particular pipelined sequence 100 that optimizes performance while providing significant flexibility in achieving various recoloring effects. Specifically, the pipelined recoloring sequence 100 includes a transformation 102 by a 5×5 matrix, a gamma correction 104, a bi-level thresholding operation 106, and a color conversion 108 to the color space of an output device. In addition, a color key operation 110 may be performed prior to the 5×5 matrix transformation 102. In the illustrated embodiment, the parameters for each of the color operation involved in the recoloring process may be provided to the associated operation module through the API 84. The parameters may be, for example, the matrix elements for the 5×5 matrix used in the transformation operation 102.

In one embodiment, a data structure named "ImageAttributes" is used for controlling the operation of the pipeline. This ImageAttributes structure 124 contains data specifying the state of the recoloring pipeline, including which modules are enabled and parameters for the operations in the pipeline, such as the values of the elements of the 5×5 matrix or the gamma value for the gamma correction step. All the recolor pipeline features are set by invoking convenient APIs to this structure. For instance, an application programmer developing software applications using the graphics tools containing the pipeline can call a SetGamma API on this object to set the gamma value, which automatically turns this feature on if required. As another example, a user may create a matrix and call a SetColorMatrix API on the same object to initialize the 5×5 matrix values in the ImageAttributes structure. This ImageAttributes structure can be passed to the API 84 for invoking the graphics tools when specifying an operation, such as drawing an image, which requires the recoloring operations of the pipeline. An application using the graphics tools containing the pipeline can have many ImageAttributes structures, which can be selected for different operations as needed for initializing the state for the internal recoloring pipeline.

Prior to discussing each of the color processing operations in the recoloring pipeline, it is noted that in a preferred embodiment this recoloring process involves two different color spaces supported by the graphics engine 72. One of the color spaces is a physical color space 112, and the other one a perceptual color space 116. A physical-based color space is based on the physics of mixing light and photons and is useful in representing colors in a way closely linked to the physical interaction of color. In contrast, a perceptual-based color spaces is based on the human visual system, i.e., how people "perceive" colors, and is useful in representing colors in a way closely linked to human perception of colors. The advantageous use of dual-color spaces for color processing is described and claimed in contemporaneously filed U.S. application Ser. No. 09/556,215 which is hereby incorporated by reference in its entirety.

In the illustrated embodiment, the perceptual-based color space 116 is the sRGB color space, and the physical-based color space 112 is the sRGB64 color space. The sRGB color space is defined by a proposed international standard IEC 61966-2-1, and the sRGB64 color space is defined by another proposed international standard IEC 61966-2-2, both these proposed standards are hereby incorporated by reference. It is assumed that the color object 70 is put in the physical-based color space prior to the recoloring processing sequence 100. In this regard, if the color object 70 is not already in the physical-based color space 112, then an appropriate conversion 120 may be performed on the color object to put it in the physical-based color space. The color key and 5×5 matrix transformation steps 110 and 102 are performed in the physical-based color space 112, while the bi-level thresholding operation 106 and output conversion 108 are performed in the perceptual color space 116. The gamma correction 104, on the other hand, may be part of the conversion operation for bringing the color object from the physical-based color space. 112 into the perceptual-based color space 116.

In accordance with an aspect of the invention, each of these color operations 102–110 in the recoloring pipeline may be selectively activated or deactivated by, for example, the graphics engine according to the settings provided by the application using the recoloring function of the graphics engine. Which ones of the steps in the recoloring sequence is to be performed or skipped and the parameters used to perform the applied steps may depends on the attributes of the color object and the recoloring effects to be achieved. Factors that may be considered in shaping the recoloring sequence include, for example, the source of the color data, the output device for visually presenting the processed color image, the input or output color formats, etc. Depending on various such factors, the operation steps in the recoloring sequence may be dynamically switched on and off, and appropriate parameters for the operations may be used to achieve the desired recoloring effects. This recoloring operation sequence takes advantage of the inherent structures contained in the steps and combine them in an optimal order that can be tailored to support various processing tasks. For instance, those skilled in the art will appreciate that by selectively switching the steps in the sequence on and off, the same software implementation can be used for chromatic adaptation, PNG gAMA, PNG cHRM, ICC profile-based color translations, and other color corrections.

The selective application of the color operation steps in the recoloring process may be controlled in various ways. For instance, a control record 122 may be used to indicate which steps of this recoloring pipeline are to be performed or skipped. In the illustrated embodiment, the control record 122 includes a plurality of flag bits, each corresponding to one step in the recoloring pipeline. By way of example, the record may contain the number 00100, which indicates that only the gamma correction operation 104 is to be performed. This may be the case, for instance, when the input color data for forming the color object is already in the sRGB64 color space and the output device supports sRGB, so that only the gamma correction is needed as part of the conversion from the sRGB64 color space to the sRGB color space.

Turning now to the color operations included in the recoloring pipeline illustrated in FIG. 3, the color key operation 110 is generally a color substitution process that replaces one color with another. This color substitution is especially useful for modifying the transparency values of the color object. For instance, if the generation of the input color data involves the use of the well-known "bluescreening" technique for background removal, then the color-key operation may be used to turn the blue background transparent.

In accordance with a feature of the invention, a 5×5 matrix is used in the transformation step 102 to perform color transformations within the color space of the color object. As will be explained in greater detail below, this 5×5 matrix can be used to perform various color transformations. Moreover, the 5×5 matrix allows those color transformations to be combined and performed in a single step, thereby providing enhanced performance.

After the operation of the 5×5 matrix, a gamma correction operation 104, which is typically carried out using a one-dimensional (1-D) look-up table (LUT), is performed on the transformed colors of the color object. As mentioned above, in a preferred embodiment, color operations are performed in both the physical-based sRGB64 color space and perceptual-based sRGB color space. The gamma correction may be part of the operation to convert the color object from the sRGB64 space (which has a gamma of 1.0) to the sRGB space (which has a gamma of 2.2). Moreover, the Gamma correction can also be used to perform at the same time "artistic" tone adjustments if the contrast of the image is too flat or too strong.

After the gamma correction operation 104, a bi-level thresholding operation 106 may be performed. This operation can be used, for example, to convert a color image to a black-and-white image that is useful for facsimile transmission, or to a pattern of a selected color on a background of another color.

Before the processed color image can be sent to an output device 96, a conversion step that changes the current color data of the color image into a color format supported by the output device may be required. Such an output color format may be one of many different color formats and may be specific to the output device. Generally, however, the output format is often an RGB format if the output device 96 is a color display, or a CMYK format when the output device is a color printer. For instance, if the output is for a printer, then the conversion process may involve a conversion from the sRGB color space to a CMYK space of the printer. The sRGB to CMYK conversion may be a simple conversion based on the well-known SWOP industry standard. Alternatively, a potentially more complicated conversion to the specific CMYK space of the printer may be performed.

In a preferred embodiment, the graphic engine 72 may also support color conversions based on color profiles. Such a profile-based conversion is defined, for example, in a proposed standard documented in International Color Consortium (ICC) Specification ICC.1:1998-09 entitled "Color Format for Color Profiles." In the case that the graphics engine supports the ICC standard and the color profile 128 of the output device 96 is known to the graphics engine, the step 108 of converting the processed color image to the output format may be replaced by a conversion operation 132 based on the color profile of the output device. Since a profile-based conversion often includes a gamma correction and a bi-level thresholding, it is possible to replace both of the steps 104 and 106 in the recoloring pipeline with the profile output conversion 132 if the gamma correction step does not involve tone adjustment. If, on the other hand, tone adjustment is desired, the gamma correction step 104 may be retained to perform only tone adjustment before the conversion 132 based on the output device color profile.

Returning now to the step 102 of transformation implemented as a multiplication by a 5×5 matrix, in this embodiment, the color-data is presented in the form of a 5-element array 136 as shown in FIG. 4A, with the first four elements A, R, G, B representing alpha (transparency), red, green, and blue components of the color, respectively. The value of each of these components ranges between 0 and 1 to represent no contribution and full intensity, respectively. The fifth element of the color array in this embodiment is set to 1, which indicates that the color vector is homogenized.

To illustrate the flexibility provided by the use of the 5×5 matrix in performing color transformations, FIGS. 4A–G shows exemplary transformation matrices for different types of transformations and effects. FIG. 4A shows a matrix 138 for a translation operation. The operation of this matrix 138 on the color vector 136 results in a translation (i.e., shift) in the color space. Specifically, the components of the transformed color vector 140 differ from those of the original color vector 136 by the values of the matrix elements $t_a$, $t_r$, $t_g$, $t_b$, respectively.

FIG. 4B shows another matrix 142 for a scaling operation. This matrix 142 has the effect of shrinking or expanding each color component of the original color vector 136 by multiplying it with a corresponding diagonal matrix element. For instance, setting the matrix element $s_g$ to 0.5 and the other diagonal elements to 1 has the effect of reducing the green component by half, without affecting the other color components.

The matrix 146 illustrated in FIG. 4C is for a rotation of the color vector 136 in the A-R plane of the color space by an angle θ. Matrices for rotations in the other planes can be similarly constructed, and matrices for general rotations can be constructed by combining the matrices for rotations in the color planes. FIG. 4D shows a matrix 148 for a shearing transformation, which increases or decreases one color component by an amount proportional to another color component. In the illustrated example, the shear matrix 148 causes the green component of the original color vector 136 to be "sheared" into the other components.

FIG. 4E shows the form of a matrix 152 for a perspective transformation. The perspective transformation results in a color vector 154 that does not necessarily have a fifth element with a value of 1. Homogenizing the transformed color vector 154 to set its fifth element to 1 has the effect of shrinking (or enlarging) the range of each color component, and the shrinking (or enlarging) factor has a contribution proportional to the size of each color component of the original color vector 136.

The basic 5×5 matrix transformation operations as described above, namely translation, scaling, rotation, shearing, and perspective, can be combined in a fairly intuitive manner using standard matrix multiplication to yield general 5×5 color transformation matrices for use in the recoloring pipeline according to the invention. Thus, in the recoloring process, a single step of carrying out the calculations for a vector transformation by a 5×5 matrix allows a selected combination of color transformations to be performed all at once. This not only provides significant flexibility in tailoring the matrix elements to achieve a desired effect but also simplifies the calculations to provide improved processing efficiency. Moreover, the use of one matrix can avoid the need for combining multiple color transformation filters to achieve the same effect. As a result, it is significantly easier for a software developer to develop and debug graphics applications using the recoloring function provided by the graphics engine 72 to obtain desired color transformation effects.

For illustration purposes, two special applications of the 5×5 transformation matrix are shown in FIGS. 4F and 4G.

The matrix 156 in FIG. 4F is for gray scale conversion, wherein a color image is converted into a gray scale image using the NTSC standard. FIG. 4G shows another convenient use of the 5×5 matrix transformation in rendering transparency on platforms that do not support transparency. The matrix 158 in FIG. 4G, for example, is for generating an alpha mask by setting all color components to 1 (full intensity) except for the alpha channel, which is untouched.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable components for processing a color object, comprising:
    a color transformation module for performing color transformation in a color space of the color object by carrying out a multiplication by a five-by-five matrix;
    a gamma correction module for performing a gamma correction operation;
    a bi-level threshold module for performing a bi-level thresholding operation;
    an output conversion module for converting colors into an output device format;
    a control component for performing a recoloring operation sequence by selectively and sequentially invoking the color transformation module, the gamma correction module, the bi-level threshold module, and the output conversion module to operate on the color object to produce color output data.

2. A computer-readable medium as in claim 1, further including a profile-based conversion module for converting a color object into the output device format based on an output device color profile.

3. A computer-readable medium as in claim 2, wherein the control component selectively invokes the profile-based conversion module as part of the recoloring operation sequence in substitution of at least the output conversion module.

4. A computer-readable medium as in claim 1, wherein the color transformation module constructs a five-element homogenized color vector from a four-component color and calculates a multiplication of the color vector by the five-by-five transformation matrix to generate a transformed color.

5. A computer-readable medium as in claim 4, wherein the multiplication of the color vector by the five-by-five transformation matrix results in a combination of translation effects selected from the group of translation, scaling, rotation, shearing, and perspective.

6. A computer-readable medium as in claim 5, wherein the multiplication of the color vector by the five-by-five transformation matrix converts the four-component color into a gray color.

7. A computer-readable medium as in claim 1, further including an application programming interface module for providing parameters used by the color transformation, gamma correction, bi-level threshold, and output conversion modules in the recoloring operation sequence.

8. A computer-readable medium as in claim 1, further including a pre-conversion module for converting the color object into a physical-based color space prior to invoking the color transformation module.

9. A computer-readable medium as in claim 8, wherein the physical-based color space is a physical-based RGB color space.

10. A computer-readable medium as in claim 9, wherein the physical-based RGB color space is the sRGB64 color space.

11. A computer-readable medium as in claim 10, wherein the gamma correction by the gamma correction module is part of a conversion from the sRGB64 color space into the sRGB color space.

12. A computer-readable medium as in claim 1, wherein the computer-executable components belong to a computer operating system.

* * * * *

UNITED STATES PATENT AND TRADEMARK OFFICE
CERTIFICATE OF CORRECTION

PATENT NO. : 6,628,828 B1
DATED : September 30, 2003
INVENTOR(S) : Stokes et al.

It is certified that error appears in the above-identified patent and that said Letters Patent is hereby corrected as shown below:

Column 3,
Line 6, "(RAM).25" should read -- (RAM) 25 --.

Column 4,
Line 42, "operating" should read -- Operating --.

Column 6,
Line 20, "color space. 112" should read -- color space 112 --.

Column 7,
Line 2, "color-key" should read -- color key --.

Column 8,
Line 1, "color-data" should read -- color data --.

Signed and Sealed this

Sixth Day of July, 2004

JON W. DUDAS
*Acting Director of the United States Patent and Trademark Office*